United States Patent
Frasher et al.

(10) Patent No.: US 6,450,530 B1
(45) Date of Patent: Sep. 17, 2002

(54) SEATING SYSTEM WITH OPTIMUM VISIBILTY

(75) Inventors: Douglas H. Frasher; Kolita Mendis, both of Newbury Park; John Downs, Simi Valley; Kristina Jonsell, Thousand Oaks, all of CA (US); Ulla-Britt Frajdin-Hellqvist, Kallered (SE); Lars Jansson, Newbury Park, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/690,295

(22) Filed: Oct. 17, 2000

(51) Int. Cl.[7] .............................................. B60R 231/32
(52) U.S. Cl. ...................................................... 280/735
(58) Field of Search ................................ 280/734, 735; 180/271, 273; 701/45

(56) References Cited

U.S. PATENT DOCUMENTS

| | | | |
|---|---|---|---|
| 4,625,329 A | * | 11/1986 | Ishikawa et al. ............ 180/271 |
| 5,653,462 A | * | 8/1997 | Breed et al. ................ 280/735 |
| 5,748,473 A | | 5/1998 | Breed et al. |
| 5,822,707 A | | 10/1998 | Breed et al. |
| 5,927,752 A | * | 7/1999 | Brandin ....................... 280/735 |
| 6,078,854 A | * | 6/2000 | Breed et al. ................... 701/49 |
| 6,134,492 A | * | 11/2000 | Breed et al. ................... 701/49 |
| 6,253,134 B1 | * | 6/2001 | Breed et al. ................... 701/49 |

FOREIGN PATENT DOCUMENTS

| | | |
|---|---|---|
| EP | 779176 | 6/1997 |
| JP | 7149258 | 6/1995 |

* cited by examiner

*Primary Examiner*—Paul N. Dickson
*Assistant Examiner*—Faye M. Fleming
(74) *Attorney, Agent, or Firm*—Mark Sparschu

(57) ABSTRACT

An automatically adjustable seat system (10) includes a sensor (48) for detecting the position of a physical feature of the driver, such as the eyes. The sensor (48) is in communication with a controller (46), which transfers the detected physical feature of the driver thereto. A seat positioning (50) mechanism is in communication with the controller (48) to automatically locate the seat (14) in a position which provides the driver with an optimum field of view. The controller (48) is also in communication with a pedal box (28) and a steering column (26) to automatically position the pedals (26), based on the information from the sensor (48), in an optimum position for use by the driver.

1 Claim, 2 Drawing Sheets

SEATING SYSTEM WITH OPTIMUM VISIBILTY

TECHNICAL FIELD

The present invention relates generally to an adjustable seating system for a vehicle, and more particularly to an automatically adjustable seating system for a vehicle that provides optimum visibility for the driver.

BACKGROUND OF THE INVENTION

Adjustable seating systems for vehicles are well known in the art. Current adjustable seating systems typically allow a user to electronically adjust a variety of seating characteristics through actuation of one or more switches or buttons. These available adjustments typically include the height of the seat base and seat back, the distance of the seat from the foot pedals and steering wheel, the angle or cant of the seat base and seat back, as well as other comfort adjustments, such as lumbar support.

Additionally, many current adjustable seat systems provide a controller with a memory source that allows for the storage of one or more custom seat settings. These custom settings allow a driver or user to position the seat according to his or her own custom setting by modifying one or more of the available adjustments and then store the custom setting on the memory source. Thereafter, the driver can automatically move the seat back to the custom setting by pressing a memory recall button instead of having to individually position each portion of the seat each time.

While these automatically adjustable seats are advantageous in that they can store the desired seat positions for multiple users for quick recall, these seat systems typically position the seat based on subjective user criteria. These user criteria, however, do not always place the user in the most optimum position from a safety standpoint or locate the user in a position with optimum field of view. For example, typical adjustable vehicle seat systems do not provide optimum field of view characteristics for multiple potential drivers regardless of their physical characteristics, such as stature. Further, typical adjustable vehicle seat systems also fail to position drivers an optimum distance from the steering column, fail to position the driver in an optimum position to view the visual displays or controls, and fail to position the driver in an optimum position to provide the best line of sight to the side mirrors. Moreover, current seat systems do not address eliminating cognitive distractions, such as those caused by a passenger, which can create potential safety concerns for a driver.

Other known systems have attempted to provide automatic positioning of some of the above adjustments through the use of a weight sensor or an out-of-position sensor. However, weight sensors are typically only available to adjust the seat height and thus, these systems are unsuccessful in providing automatic adjustment to account for all the criteria set forth above. Additionally, systems with weight sensors do not address all of the safety issues set forth above.

SUMMARY OF THE INVENTION

It is an object of the present invention to provide an automatically adjustable seat system that provides optimum comfort characteristics for a wide range of drivers having varying physical characteristics.

It is yet another object of the present invention to provide an automatically adjustable seat system that provides optimum visibility through the windows, optimum view of the instrument displays, and control of the foot and hand controls with greater consistency than conventional seating systems.

It is still another object of the present invention to provide an automatically adjustable seat system that ensures a proper seating position for drivers having a wide range of physical characteristics by maximizing the distance between the driver and the airbag contained in the steering wheel.

It is still a further object of the present invention to provide an automatically adjustable seat system that positions a driver in an optimum position from a safety standpoint based on the sensed location of a physical feature of the driver.

In accordance with the above and the other objects of the present invention, an automatically adjustable seat system is provided. The seat system includes a sensor for detecting the position of a physical feature of a driver, such as the driver's eyes or other physical feature. The sensor is in communication with a controller to which the detected physical position of the driver feature is transferred. A seat and headrest positioning mechanism is in communication with the controller to automatically locate the seat and headrest in a position which provides the driver with an optimum field of view, based on the information from the sensor. A pedal box with at least one control pedal is in communication with the controller to automatically position the pedals, based on the information from the sensor, in an optimum position for use by the driver. A steering column mechanism is also in communication with the controller to automatically position the steering wheel and other hand controls, based on the information from the sensor, in an optimum position for use by the driver.

These and other features of the present invention will become apparent from the following description of the invention, when viewed in accordance with the accompanying drawings and appended claims.

DETAILED DESCRIPTION OF THE PREFERRED EMBODIMENTS

Figure 1:
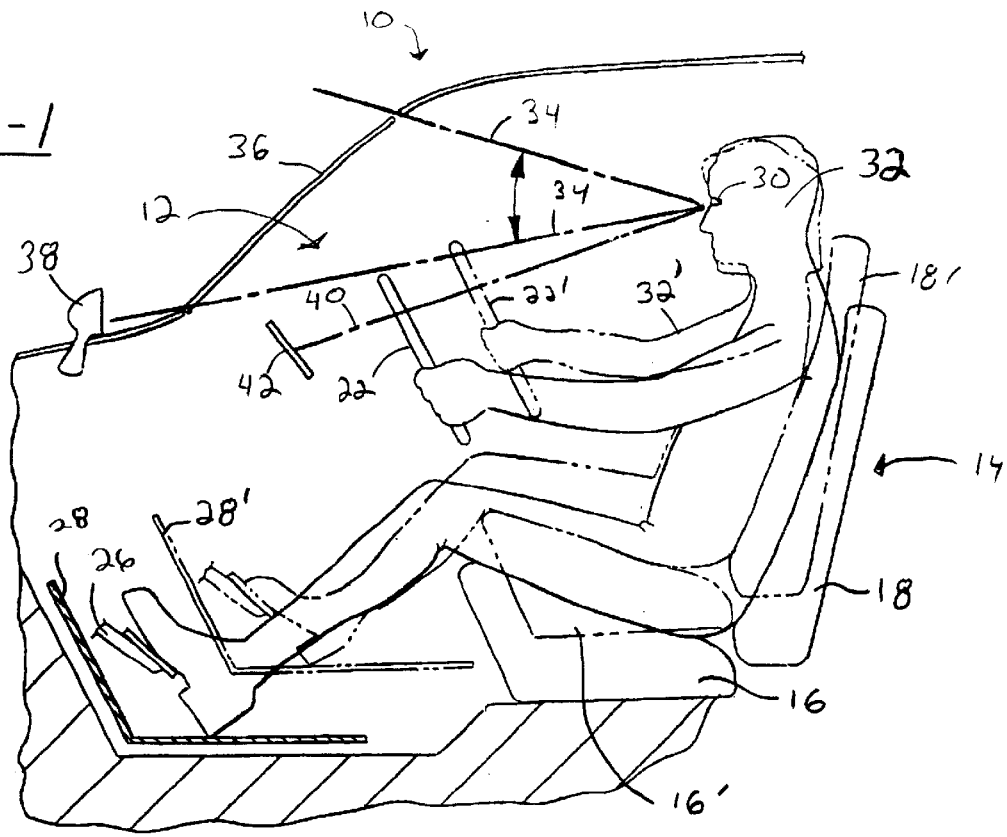
FIG. 1 is a schematic illustration of the river compartment of a vehicle illustrating the components of an adjustable seat system in a position to provide optimum field of view in accordance with a preferred embodiment of the present invention.
Figure 2:
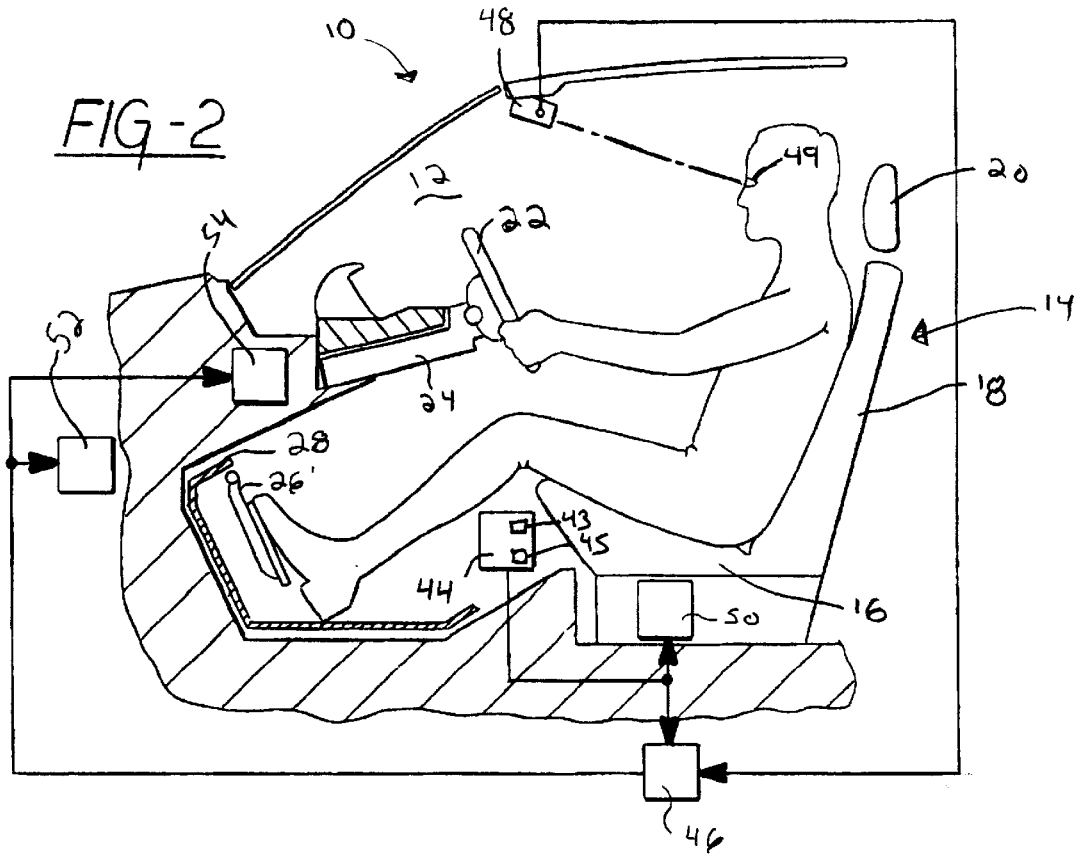
FIG. 2 is a schematic illustration of the driver compartment of a vehicle illustrating a fixed driver sensor and associated control equipment in accordance with a preferred embodiment of the present invention.
Figure 3:
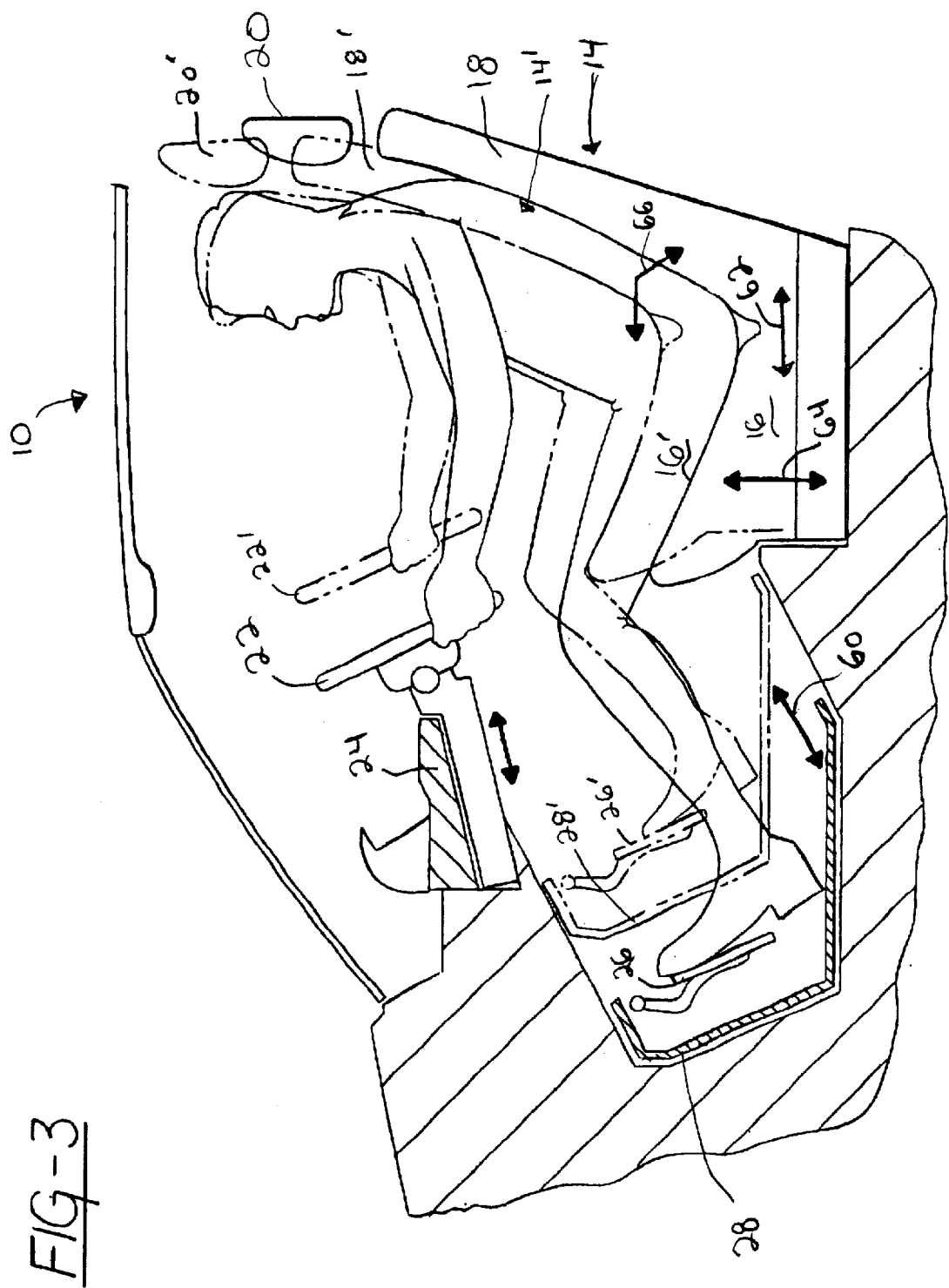
FIG. 3 is a schematic illustration of the driver compartment of a vehicle illustrating the movement of the components of an adjustable seat system in accordance with a preferred embodiment of the present invention.

Referring now to FIGS. 1 through 3, an adjustable seat system 10 in accordance with the present invention is disclosed. The seat system 10 is described generally with respect to the driver's compartment of an automobile, as generally indicated by reference number 12. The seat system 10 can alternatively be incorporated into the passenger (front or rear) compartment of the automobile or into other vehicles of transportation (trucks, boats, etc.) where adjustment can affect the user's field of view.

The seat system 10 includes a vehicle seat 14, including a seat base 16 and a seat back 18. A seat headrest 20 is also preferably included, which is separately adjustable from the seat back 18. Alternatively, the seat back 18 and the seat headrest 20 may be formed as a single unit and are thereby adjustable together or the seat back 18 may be eliminated altogether. The seat system 10 also includes a steering wheel 22, which is secured to and extends outwardly from a steering column mechanism 24. The seat system 10 also preferably includes at least one foot pedal 26, which is positioned in a moveable structure such as a pedal box 28. As will be understood, multiple foot pedals, such as an accelerator and a brake, will typically be included in the pedal box 28.

The seat system 10 allows the seating position of the driver to be automatically adjusted, through a variety of manipulations so that the driver's eyes are located at a predetermined vertical and horizontal position, referred to generally as the fixed point and generally indicated by reference number 30. As discussed in more detail below, the vehicle seat 14, the steering wheel 22, and the pedal box 28 are all automatically adjustable to accommodate a wide range of drivers having varying sizes and statures.

As shown in FIG. 1, in a first position, the seat 14, including the seat base 16, the seat back 18, the steering wheel 22, and the pedal box 28 are all adjusted so that a driver 32, shown in solid lines, has his or her eyes at the fixed point 30. To accommodate a driver 32', shown in phantom, of a different size or stature, the seat 14, including the seat base 16 and the seat back, the pedal box 28, and the steering wheel 22 are all adjusted, such that the eyes of the driver 32' are also located at the fixed point 30. Specifically, to locate the eyes of the driver 32' at the fixed point 30, the seat base is moved to a location indicated by 16' and the seat back is moved to a location indicated by 18'. Similarly, the steering wheel is moved to a position indicated by 22' and the pedal box is moved to a position indicated by 28'. The fixed eye position 30, thus allows consistent sight lines, generally indicated by reference number 34, through the windows 36 and to the external mirrors 38. Similarly, sight lines 40 to the instrument displays 42 are more consistent for drivers of all sizes. This is true, as shown in FIG. 1, for the driver 32' which has shorter arms and shorter legs than the driver 32.

The seat system 10 based on the fixed eye point 30 provides a high level of ergonomic accommodation for drivers of different heights, sizes or statures. The preferred seat system 10 also allows a wide range of drivers to sit comfortably and have good visibility through the windows, good visibility of the instrument displays, and the ability to operate the foot and the hand pedals with greater consistency than in a conventional seating system. Ensuring a proper seating position for all drivers, i.e., a system that accomplishes all of the objectives set forth above, also maximizes the distance between the driver and the airbag, which typically is positioned in the center of the steering wheel 22.

To accomplish the above objects, the seat system 10 senses the eye position of the driver and then automatically adjusts the seat 14 for optimum eye position of the driver. The pedals 26 and steering column 24 are moved accordingly to provide a good seating position. The seat adjustment process of the system 10 is preferably automatic and is initiated by the depression of a button 43 in the seat control cluster, as generally indicated by reference number 44. Actuation of the button 43 activates a central control unit 46, which controls the positioning components. The automatic positioning system preferably operates only when the vehicle is at rest.

In accordance with a preferred embodiment, after the button 43 has been depressed, the control unit 46 queries one or more eye position sensors 48 to determine the initial eye position of the driver, as generally indicated by reference 49. The one or more eye sensors 48 may involve video image recognition technology or head proximity sensors that infer eye position from stored anthropometric data. Based on the sensed information, the electronic control unit 46 calculates the difference between the initial eye position 49 and the ideal eye position 30. Based on the calculated difference, the control unit 46 issues a command to the motorized seat mechanism 50 to move the seat 14, including the seat base 16 and the seat back 18, as required for the driver to attain the ideal or fixed eye position 30.

It should be understood that the eye position sensor 48 can be any type of eye position sensor that can accurately locate the position of the driver's eyes. Further, while the preferred seat system 10 is adjustable based on initial eye position, it should be understood that any other physical characteristics of the driver can be detected to attain the ideal positions for the driver, such as the forehead, nose, mouth, ear or chin. Moreover, while it is preferable that the seat system 10 be adjusted only when the vehicle is rest, it should be understood that the components of the system 10 can be also adjusted while the vehicle is moving. Additionally, while the seat system 10 preferably is initiated by depression of the button 43 located on the controls cluster 44, it should be understood that the process may also be initiated by other methods, such as verbal commands, or set to be initiated automatically, for example, when the vehicle is started. To attain the ideal position for the driver, the seat 14, the steering column mechanism 24 and the pedal box 28 can be manipulated through multiple degrees of freedom. Any type of known positioning mechanism can be utilized to locate the seat 14, the steering wheel 14, and the pedal box 28.

After the seat 24, including the seat base 16, the seat back 18, and the headrest 20, if present, is moved to its final position, the control unit 46 may query the eye position sensor 48 for verification that the driver's eyes are in the optimum position. The control unit 46 also calculates a suitable pedal position and steering wheel position for the driver, based upon driver's stature inferred from the required seat height. The controller may also utilize feedback from one or more seat weight sensors, preferably located within the seat, as an additional variable for the above calculations. The required pedal position is conveyed to a motorized floor module 52 and the required steering wheel position is conveyed to a motorized steering column assembly 54 which control the movement of the pedal box 28 and the steering column 24, respectively. The seat 14, the pedal box 28, and the steering column 24 adjustments occur simultaneously.

After the recommended optimum position is reached, the driver can reposition the seat 14, the pedal 26, and the steering wheel 22, according to personal preference by means of manual positioning controls, generally indicated by reference number 45 provided in the seat controls cluster 44. The driver can also adjust the angle or cant of the seat back 18. Any changes in seat back angle are supplemented automatically with corrections to the fore or aft position of the seat bottom 16 in order to maintain the optimum fixed eye position 30. Manual adjustments by the driver preferably are affected at a slower adjustment speed than the automatic adjustments.

FIG. 3 illustrates an alternative embodiment of the seat system 10 in accordance with the present invention. As shown, the movements of the pedal box 28 and the steering column mechanism 24 are condensed into single degrees of freedom along straight lines. The pedal box 28 is adjustable along a straight line defined by the arrow 60 to a position such as that generally indicated by 28'. The pedal 26 is adjustable along the same general line 60 to a position such as that generally indicated by 26'. The fore and aft position of the seat 14 and the seat base 16 are adjustable along a straight line defined by the arrow 62 to positions generally indicated by 14' and 16'. The vertical position of the seat 14, seat base 16, the seat back 18 (and headrest 20), are adjustable along a straight line defined by the arrow 64 to positions indicated by 14', 16', 18' and 20'. The angle of the seat back 18 is adjustable as shown by the arrow 66. These adjustments are all along a single degree of freedom defined by the straight lines indicated above and are all made while maintaining the fixed eye position with respect the interior of the car. The orientation and direction of the ranges of motion of the three modules (14, 22, 28) capture a wide range of driver statures.

The disclosed seat system 10, thus provides many advantages over prior conventional seat systems. First, the driver has improved visibility out of the car, to the side mirrors and to the instrument panel. Further, by fixing the eye or other physical feature of the driver, multiple safety benefits are also achieved. Initially, the driver is located an optimum position from the steering wheel and thus the airbag. Additionally, the driver's head is located further away from the vehicle cage, which provides advantages in that it minimizes potential head impact in the event of a collision. Moreover, the seat belt can be optimally positioned and the external mirrors can be made smaller. Also, the driver is positioned such that he or she will not inadvertently see what the passenger is doing, thereby minimizing cognitive distractions.

Having now fully described the invention, it will be apparent to one of ordinary skill in the art that many changes and modifications can be made thereto without departing from the spirit or scope of the invention as set forth herein.

What is claimed is:

1. A method of automatically adjusting a vehicle seat system, comprising:

sensing a position of a physical feature of a driver, receiving said sensed position at a controller, determining a position for said physical feature that provides optimum field of view through a vehicle window, to a plurality of side mirrors, and to a display panel;

locating said physical feature at said fixed position through adjustment of a vehicle seat; and initiating said step of sensing through verbal activation.

* * * * *